(12) United States Patent
Badger

(10) Patent No.: US 8,064,342 B2
(45) Date of Patent: Nov. 22, 2011

(54) LOAD BALANCING SESSION INITIATION PROTOCOL (SIP) SERVERS

(75) Inventor: Brian S. Badger, Divide, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1405 days.

(21) Appl. No.: 11/553,728

(22) Filed: Oct. 27, 2006

(65) Prior Publication Data

US 2008/0101335 A1    May 1, 2008

(51) Int. Cl.
*H04J 1/16* (2006.01)
*H04L 12/28* (2006.01)
*H04L 12/56* (2006.01)
*H04W 72/00* (2009.01)

(52) U.S. Cl. ............... 370/230; 370/395.2; 370/410; 455/453

(58) Field of Classification Search .............. None
See application file for complete search history.

(56) References Cited

U.S. PATENT DOCUMENTS

| 7,330,470 | B2 * | 2/2008 | Nakazawa et al. | 370/392 |
| 7,805,517 | B2 * | 9/2010 | Shim et al. | 709/227 |
| 2004/0088424 | A1 * | 5/2004 | Park et al. | 709/229 |
| 2006/0242300 | A1 * | 10/2006 | Yumoto et al. | 709/226 |

OTHER PUBLICATIONS

Rosenberg et al., "Session Initiation Protocol (SIP): Locating SIP Servers", Network Working Group, Request for Comments: 3263, Jun. 2002.
Gulbrandsen et al., "A DNS RR for Specifying the Location of Services (DNS SRV)", Network Working Group, Request for Comments: 2782, Feb. 2000.
Rosenberg et al., "SIP: Session Initiation Protocol", Network Working Group, Request for Comment: 3261, Jun. 2002.

* cited by examiner

*Primary Examiner* — Daniel J Ryman
*Assistant Examiner* — Cassandra Decker

(57) ABSTRACT

A device receives Session Initiation Protocol (SIP) requests that include registration information, and load balances a SIP call based on the registration information of the SIP requests.

16 Claims, 13 Drawing Sheets

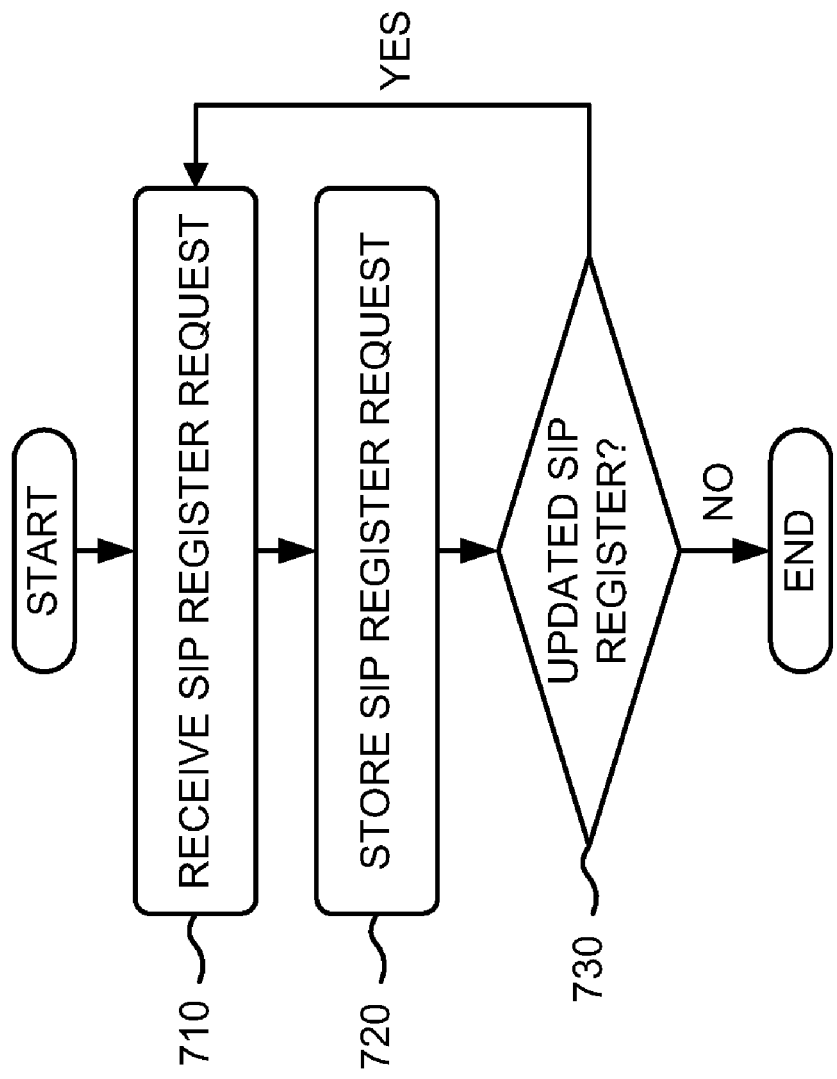

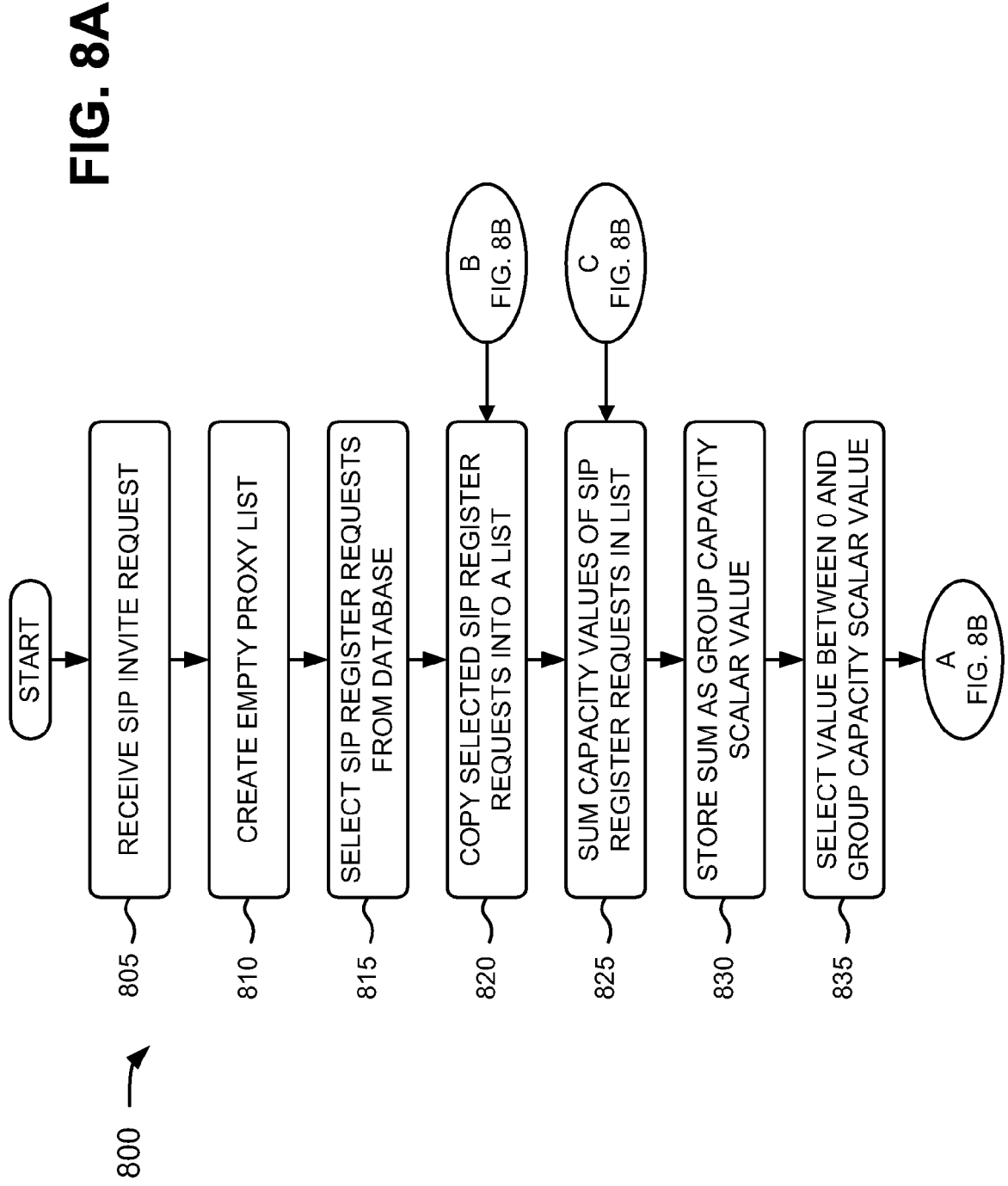

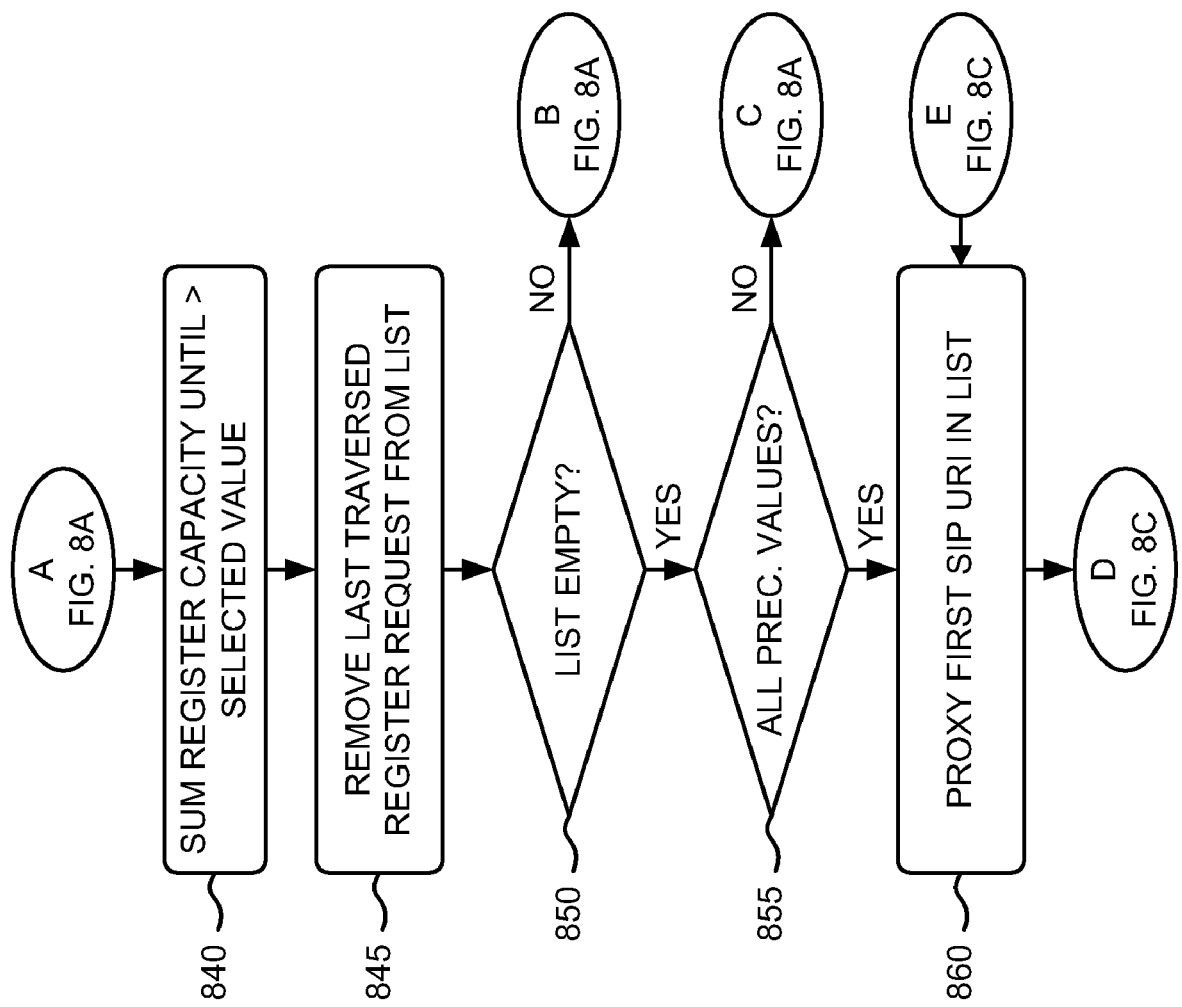

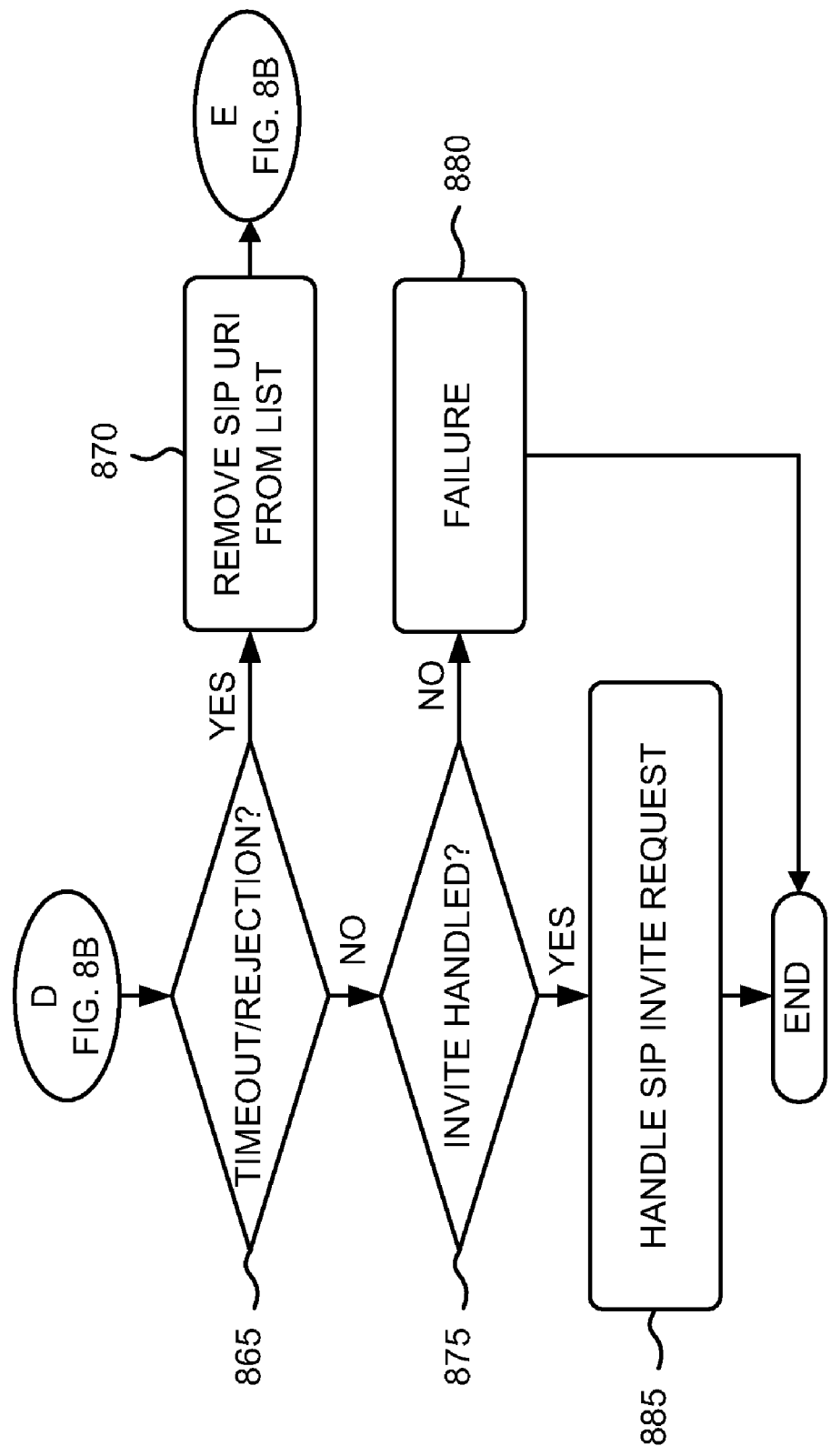

LOAD BALANCING SESSION INITIATION PROTOCOL (SIP) SERVERS

BACKGROUND INFORMATION

Session Initiation Protocol (SIP) is an application-layer control (i.e., signaling) protocol for creating, modifying, and terminating sessions with one or more participants. These sessions may include Internet-based telephone calls, multimedia distribution, multimedia conferences, instant messaging conferences, interactive voice response (IVR), automated and manual operator services, automatic call distribution, call routing, etc. SIP invitations or SIP INVITE requests may be used to create sessions and may carry session descriptions that allow participants to agree on a set of compatible media types. SIP may use proxy servers to help route requests to a user's current location, authenticate and authorize users for services, implement provider call-routing policies, and/or provide other features to users. SIP may also provide a registration function that allows users to upload their current locations for use by proxy servers.

Typically, SIP uses SRV DNS (Domain Name System) record resolution, per Internet Engineering Task Force (IETF) documents RFC 3263 and RFC 2782, for the purpose of load balancing between multiple SIP servers. The load balancing algorithm described in RFC 2782 may be ideally suited for load balancing of SIP servers, but a TTL (Time To Live) parameter provided in the DNS record resolution is usually set to a duration on the order of a few hours. As a result, capacity changes or outages in SIP servers cannot be communicated effectively using such a DNS mechanism because it is too slow.

For example, a SIP server may have a finite set of resources with which to service calls (e.g., digital signal processing (DSP) resources on an IVR server may be limited to three-hundred simultaneous calls). DNS-based load balancing per RFC 3263 and RFC 2782 would attempt to balance new SIP dialogs between multiple SIP servers without any consideration for the number of calls already in progress. The DNS TTL parameter makes it impossible for the SIP server to timely revise its traffic allocation to account for current resource availability because any change to traffic allocation would not occur for hours. By the time the revised traffic allocation is implemented, the allocation value has been superseded numerous times, and any call blockages intended to be avoided by load balancing have long since occurred.

BRIEF DESCRIPTION OF THE DRAWINGS

FIGS. 7-8C are flowcharts of exemplary processes for a SIP proxy server of FIGS. 1 and 3 according to implementations consistent with principles of the invention.

DETAILED DESCRIPTION OF PREFERRED EMBODIMENTS

The following detailed description of the invention refers to the accompanying drawings. The same reference numbers in different drawings may identify the same or similar elements. Also, the following detailed description does not limit the invention.

Implementations described herein may provide systems and methods that use SIP messaging between a SIP server(s) and a load balancing SIP proxy server(s) to permit real-time control of inbound traffic allocation. The systems and methods may implement the logic of load balancing traffic to individual SIP servers in the SIP proxy server(s), rather than in the DNS resolution process. This may permit the SIP proxy server(s) to update the traffic allocation parameters on an instantaneous basis.

Figure 1:
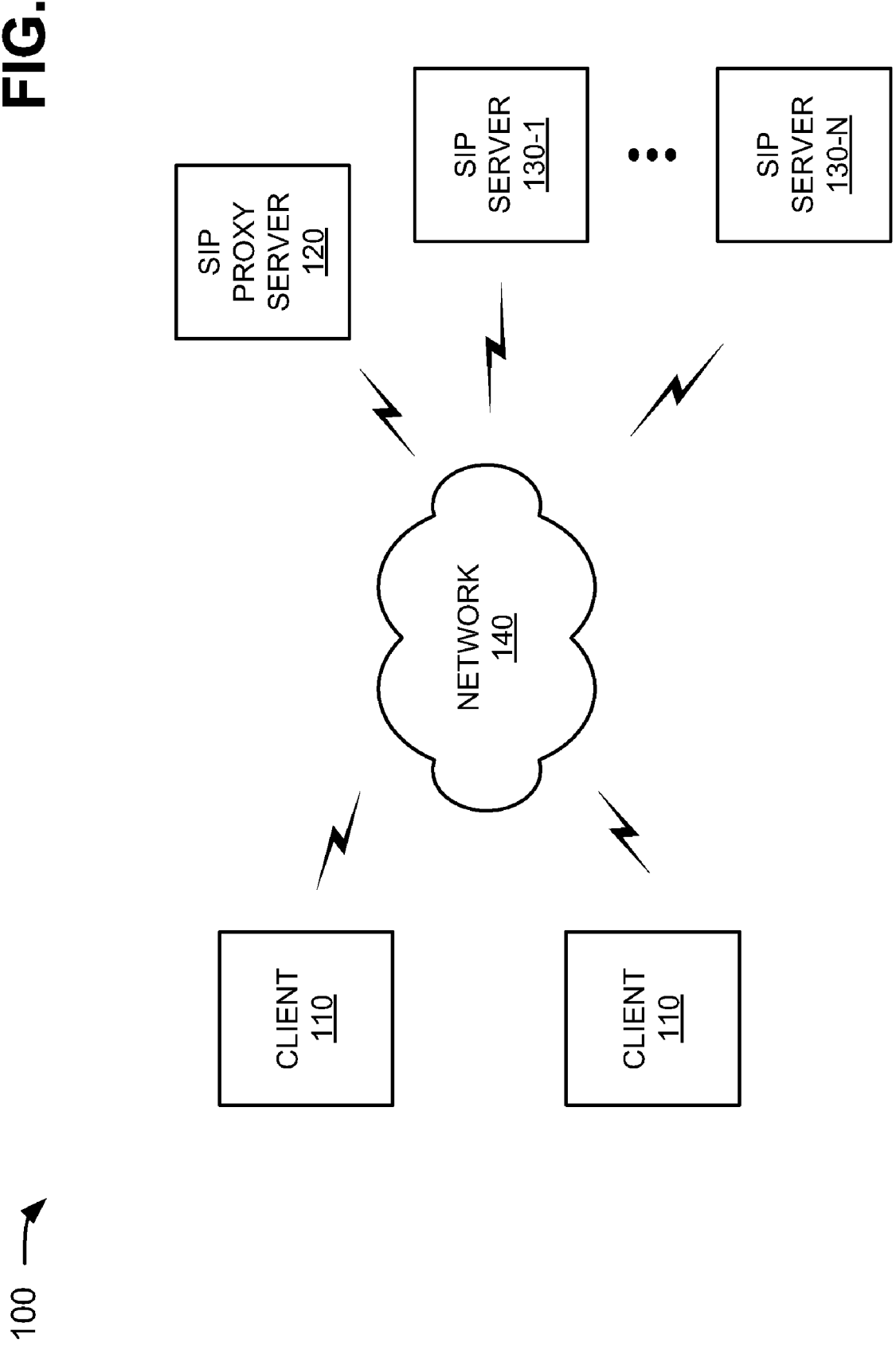
FIG. 1 is a diagram of an exemplary network in which systems and methods described herein may be implemented.

FIG. 1 is a diagram of an exemplary network 100 in which systems and methods described herein may be implemented. Network 100 may include multiple clients 110 connected to multiple servers (e.g., a SIP proxy server 120, and SIP application servers 130-1, ..., 130-N, collectively referred to as "SIP servers 130") via a network 140. Network 140 may include a local area network (LAN), a wide area network (WAN), a telephone network, such as the Public Switched Telephone Network (PSTN), an intranet, the Internet, or a combination of networks. Two clients 210 and three servers 120-130N have been illustrated as connected to network 140 for simplicity. In practice, there may be more or fewer clients and servers. Also, in some instances, a client may perform one or more functions of a server and/or a server may perform one or more functions of a client. In other instances, SIP server 130 may perform one or more functions of SIP proxy server 120, or SIP proxy server 120 may perform one or more functions of SIP server 130.

Clients 110 may include client entities. An entity may be defined as a device, such as a personal computer, a SIP telephone, a wireless telephone, a personal digital assistant (PDA), a lap top, or another type of computation or communication device, a thread or process running on one of these devices, and/or an object executable by one of these devices.

SIP proxy server 120, also commonly referred to as a network server, may include a device that facilitates the establishment of SIP calls. A "SIP call," as the term is used herein, is to be broadly interpreted to include any out-of-dialog or dialog-establishing SIP method (e.g., a SIP INVITE request, a SIP SUBSCRIBE request, a SIP REFER request, a SIP OPTIONS request, a SIP MESSAGE request, a SIP REGISTER request, etc.).

As described in RFC 2543, SIP proxy server 120 may act as both a server and a client for the purpose of making requests on behalf of other clients. Requests are serviced internally or by passing them on, possibly after translation, to other servers. SIP proxy server 120 may interpret, and, if necessary, rewrite a request message before forwarding it.

SIP servers 130 may include server entities that are capable of facilitating SIP-based communications, e.g., Internet-based telephone calls, multimedia distribution, multimedia conferences, instant messaging conferences, interactive voice response (IVR), automated and manual operator services, automatic call distribution, call routing, etc.

Servers 120-130N may include server entities that gather, process, search, and/or maintain documents. Clients 110 and servers 120-130N may connect to network 140 via wired, wireless, and/or optical connections.

While servers 120-130N are shown as separate entities, it may be possible for one or more of servers 120-130N to perform one or more of the functions of another one or more of servers 120-130N. For example, it may be possible that two or more of servers 120-130N are implemented as a single server. It may also be possible for a single one of servers 120-130N to be implemented as two or more separate (and possibly distributed) devices.

Although implementations are described below in the context of SIP and an Internet Protocol (IP)-based network, in other implementations equivalent or analogous communication protocols (e.g., International Telecommunication Union (ITU) H.323) and/or types of transport networks (e.g., asynchronous transfer mode (ATM), frame relay, etc.) may be used. Both the ITU H.323 standard and the IETF's SIP are examples of protocols that may be used for establishing a communications session among terminals, such as clients 110, connected to a network. Although SIP-type messages are shown for convenience, any type of protocol or a mixture of such protocols may be applied in various parts of the overall system.

Figure 2:
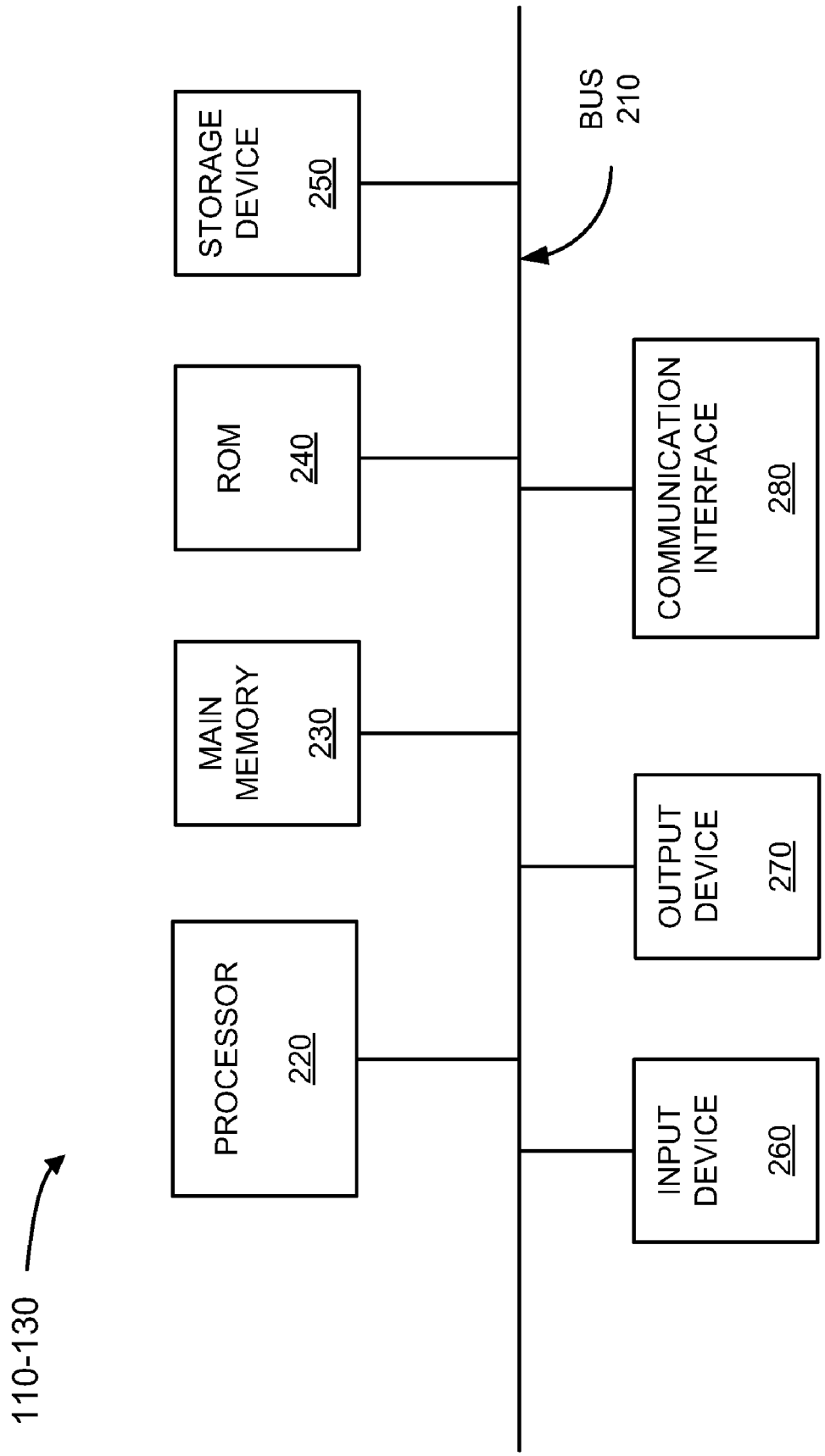
FIG. 2 is an exemplary diagram of a client or server of the exemplary network of FIG. 1.

FIG. 2 is an exemplary diagram of a client or server entity (hereinafter called "client/server entity"), which may correspond to one or more of clients 110 and servers 120-130N. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information into the client/server entity, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

As will be described in detail below, the client/server entity may perform certain load balancing operations. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

Figure 3:
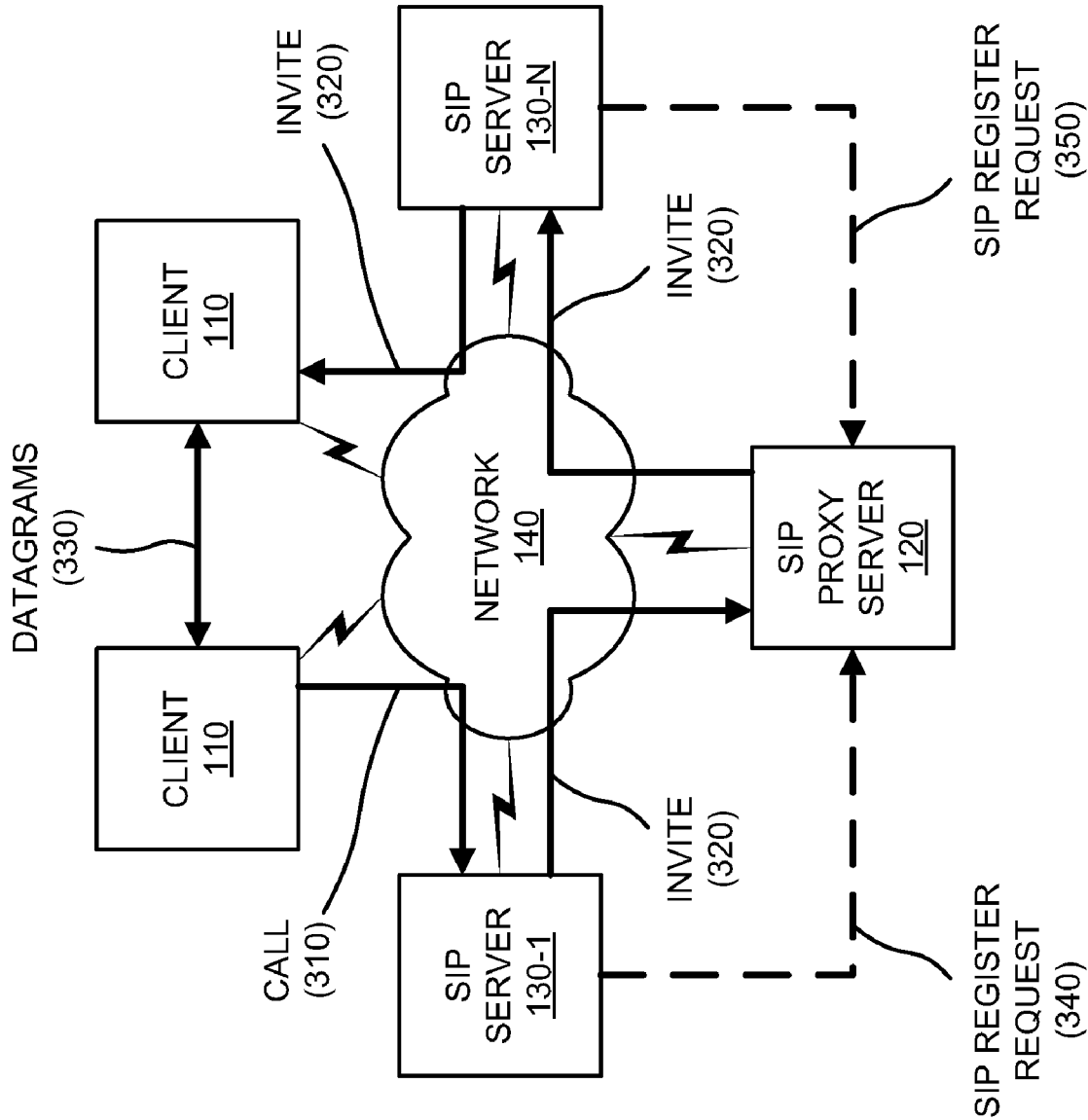
FIG. 3 is a diagram of exemplary operations performed by the exemplary network of FIG. 1.

FIG. 3 is a diagram of exemplary operations performed by network 100. As shown, client 110 may wish to communicate with the other client 110, and may initiate a SIP call 310 to request such communication. SIP call 310 may be provided via network 140 to SIP server 130-1. SIP server 130-1 may generate a SIP INVITE request 320 that invites the other client 110 to the call. SIP INVITE request 320 may be provided via network 140 to SIP proxy server 120, and SIP proxy server 120 may determine which SIP server to send SIP INVITE request 320. For example, SIP proxy server 120 may send SIP INVITE request 320 to SIP server 130-N. SIP server 130-N, in turn, may send SIP INVITE request 320 to the other client 110, and the other client 110 may accept or reject SIP INVITE request 320. If client 110 accepts SIP INVITE request 320, clients 110 may exchange datagram(s) 330. A "datagram(s)" may include any type or form of data, e.g., packet or non-packet data, Internet-based telephone calls (voice data), multimedia distribution, multimedia conferences, instant messaging conferences, etc.

In one implementation, SIP proxy server 120 may remain involved in SIP call 310, even after SIP call 310 is established and clients 110 are exchanging datagram(s) 330, to provide additional features (e.g., conferencing services, accounting, etc.). In another implementation, SIP servers 130-1 and 130-N may provide SIP REGISTER requests 340 and 350, respectively, to SIP proxy server 120. SIP proxy server 120 may use SIP REGISTER requests 340 and 350 to determine load balancing, as described below.

In another implementation, SIP proxy server 120 may have no knowledge of which SIP servers 130 may register with it. SIP servers 130 may be configured to register with SIP proxy server 120, e.g., via SIP REGISTER requests 340 and 350. However, each SIP server 130 may have no knowledge of the configuration(s) and/or existence of any other SIP server 130.

Figure 4:
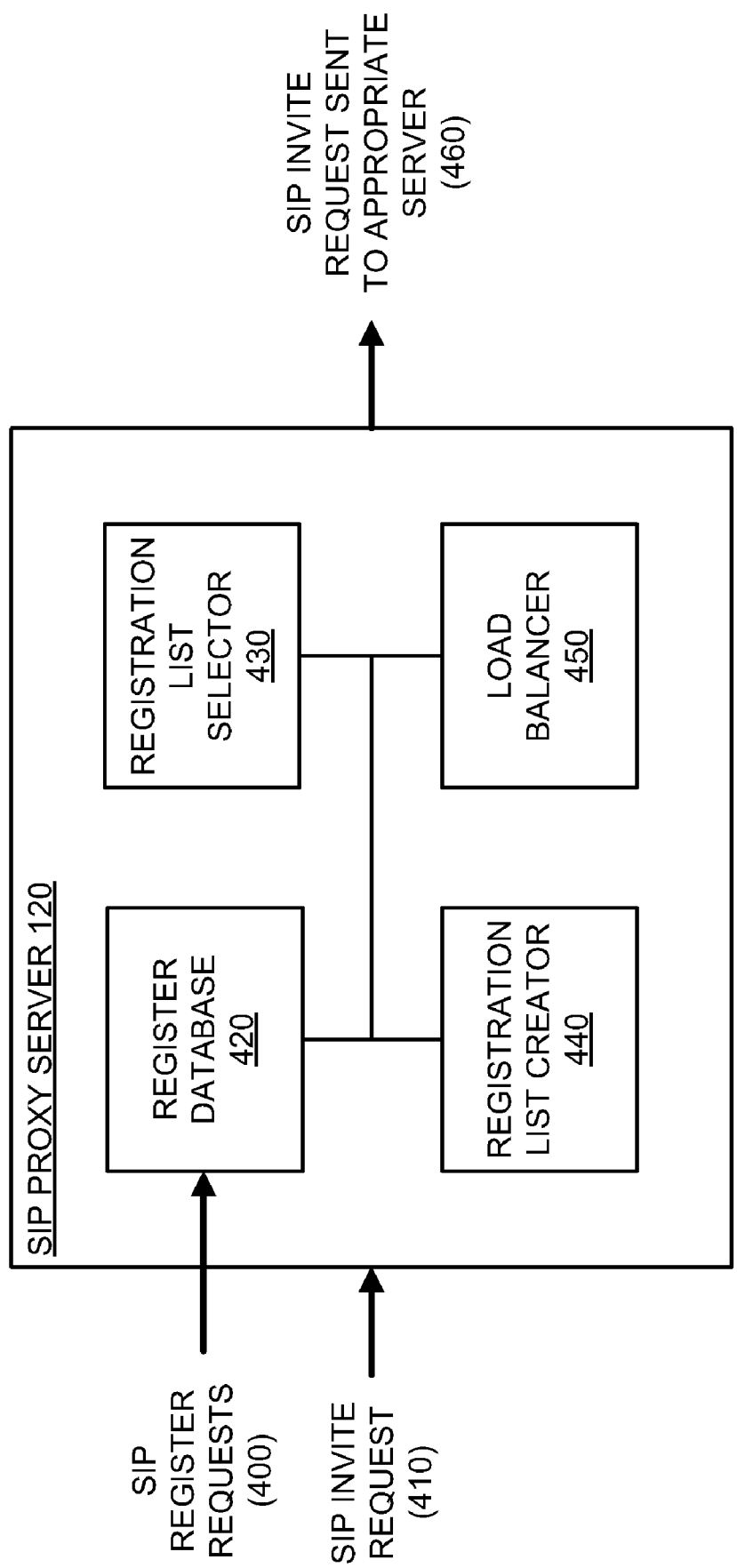
FIG. 4 is an exemplary diagram of a SIP proxy server of the exemplary network of FIGS. 1 and 3.

FIG. 4 is an exemplary diagram of SIP proxy server 120 of exemplary network 100. As shown, SIP proxy server 120 may receive SIP requests that include registration information (or SIP REGISTER requests) 400 from SIP servers 130, and may receive SIP INVITE requests 410 for new inbound calls from clients 110 and/or SIP servers 130. SIP proxy server 120 may include a register database 420, a registration list selector 430, a registration list creator 440, and a load balancer 450.

SIP proxy server 120 may store SIP REGISTER requests 400 in register database 420. In one implementation, register database 420 may include a device capable of storing information (e.g., main memory 230, ROM 240, and/or storage device 250 of FIG. 2). As described below in connection with FIG. 5, each SIP REGISTER request 400 may include a variety of registration information, e.g., a SIP server SIP Uniform Resource Identifier (URI) space parameter, a SIP server precedence parameter, registration duration parameter, and/or a SIP server capacity parameter. Such registration information may be stored in register database 420.

Registration list selector 430 may perform a variety of tasks. For example, registration list selector 430 may create an empty proxy list, and may select SIP REGISTER requests 400 from register database 420 that may be utilized to create a registration list. In one implementation, registration list selector 430 may select SIP REGISTER requests 400 that have SIP URI spaces that are inclusive of a request URI of SIP INVITE request 410, and/or that have registration durations that are not expired.

Registration list creator 440 may perform a variety of tasks. For example, in one implementation, registration list creator 440 may create an ordered registration list by copying SIP REGISTER requests 400 selected by registration list selector 430 that have equal, highest precedence values. In another implementation, registration list creator 440 may create the empty proxy list instead of registration list selector 430.

Load balancer 450 may perform a variety of tasks that permit real-time control of inbound traffic allocation (e.g., SIP INVITE requests 410). For example, in one implementation, load balancer 450 may sum capacity values of SIP REGISTER requests 400 in the registration list and may store (e.g., in main memory 230, ROM 240, and/or storage device 250) the sum as a group capacity scalar value. Load balancer 450 may choose a uniformly distributed random value between zero (0) and the stored group capacity scalar value. Load balancer 450 may traverse the registration list in order, and may accumulate the capacity of each SIP REGISTER request 400 until the accumulated capacity value is greater than the chosen random value. Load balancer 450 may remove the last SIP REGISTER request 400 traversed from the registration list and may provide the last SIP REGISTER request 400 traversed at the end of the proxy list. SIP proxy server 120 may repeat the tasks performed by registration list creator 440 and load balancer 450 until the registration list is empty. Load balancer 450 may repeat the calculation of the group capacity scalar value until registered precedence values have been processed from highest to lowest.

Load balancer 450 may proxy to a first SIP URI in the proxy list. If SIP INVITE request 410 times out or is rejected, load balancer 450 may remove the first SIP URI from the proxy list. Load balancer 450 may repeat these tasks until the proxy list is exhausted or until SIP INVITE request 410 is successfully accepted or handled by one of SIP servers 130. For example, if one SIP server 130 accepts SIP INVITE request 410, SIP proxy server 120 may send SIP INVITE request 410 to the appropriate SIP server 130 (as shown by reference number 460). If no SIP servers 130 handle SIP INVITE request 410, load balancer 450 may provide a failure response (e.g., to client 110 and/or SIP server 130 providing SIP INVITE request 410).

Although FIG. 4 shows exemplary components of SIP proxy server 120, in other implementations SIP proxy server 120 may contain fewer or additional components that may permit real-time control of inbound traffic allocation. In still other implementations, one or more components of SIP proxy server 120 may perform the tasks performed by other components of SIP proxy server 120.

Figure 5:
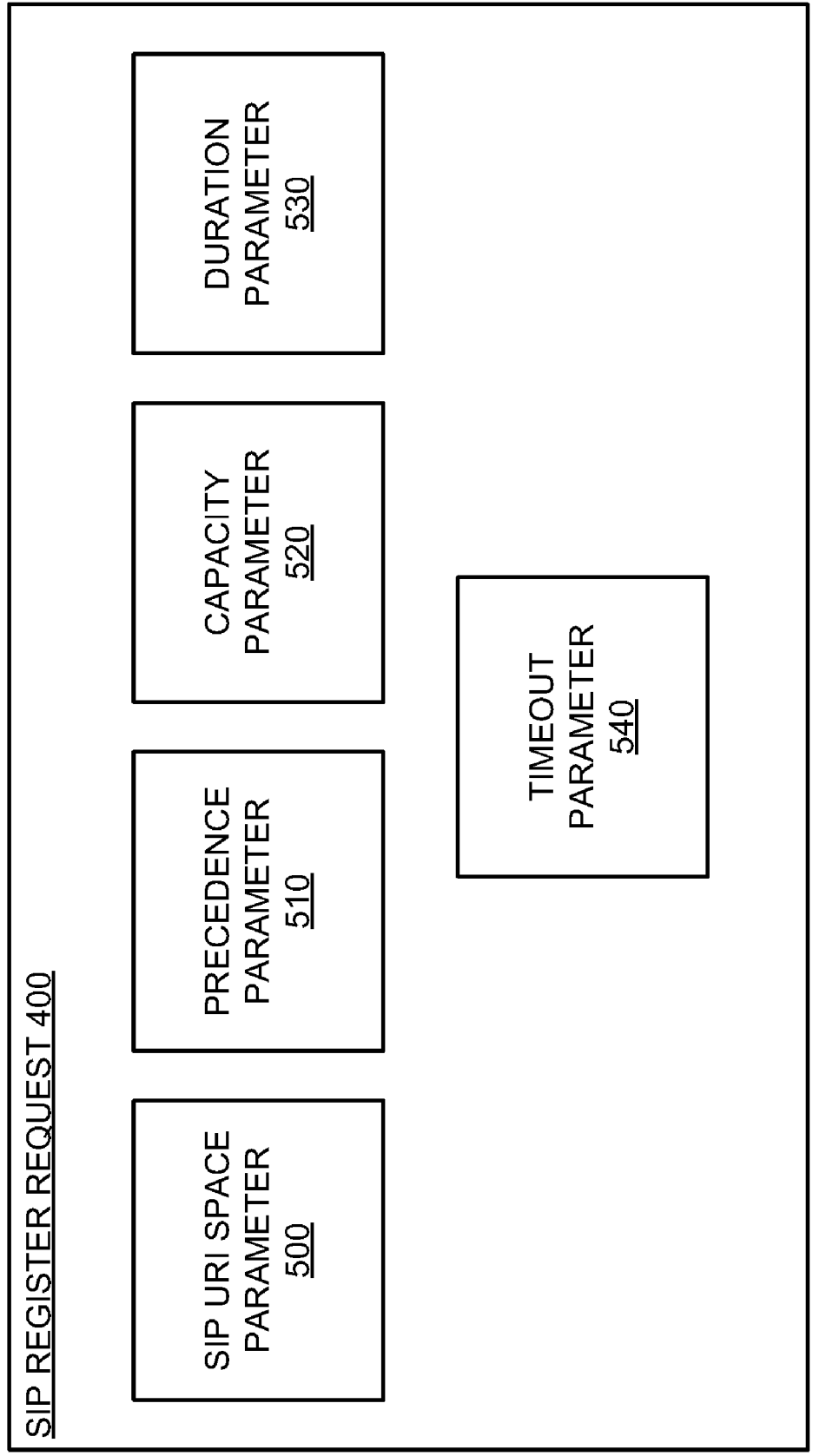
FIG. 5 is an exemplary diagram of a SIP REGISTER request capable of being received by the SIP proxy server of FIG. 4.

FIG. 5 is an exemplary diagram of elements of SIP REGISTER request 400 (or SIP REGISTER requests 340 and 350 in FIG. 3). As shown, each SIP REGISTER request 400 may contain a variety of elements. For example, SIP REGISTER request 400 may include a SIP URI space parameter 500, a precedence parameter 510, a capacity parameter 520, a duration parameter 530, and/or a timeout parameter 540. The elements of SIP REGISTER request 400 may be in the form of specially defined extension headers to SIP REGISTER request 400.

SIP URI space parameter 500 may be a pattern to which a received SIP URI may be matched. SIP URI space parameter 500 may include "wildcard" values or regular expressions to define a domain of SIP URI values that may match a received SIP URI.

Precedence parameter 510 may specify a class of service that SIP server 130 provides for a specified SIP URI. Precedence parameter 510 may be expressed as an integer value, with higher values indicating a higher class of server. SIP servers 130 of equal precedence may be considered equivalent, whereas SIP servers 130 of greatest precedence may be offered new SIP INVITE requests first. In this way, SIP servers 130 may register as a "secondary" or "failsafe" server for a specified SIP URI, but may not see any traffic allocation. If a "primary" SIP server 130 of higher precedence is functional, "secondary" SIP servers 130 of lower precedence may not see any traffic.

In one example, a first SIP server that may provide an IP prepaid service might register for URI "sip:prepaid@app.name.com" with a precedence of "10." A second SIP server, which may not provide the IP prepaid service but may provide a customer treatment or queuing service for blocked IP prepaid calls, might register with the same URI but with a precedence of "0." The lower precedence second SIP server may not see any calls while the higher precedence first SIP server is available. However, if the higher class services (e.g., the IP prepaid service) timeout or go out of service, the lower class services (e.g., the service for blocked IP prepaid calls) may be used.

Capacity parameter 520 may be a scalar value defining a capacity value of an individual SIP server 130. Capacity parameter 520 may specify the quantity of service that SIP server 130 may provide for a specified SIP URI. In one implementation, capacity parameter 520 may be expressed as a non-negative scalar integer value, with "0" indicating no capacity for SIP server 130. The fraction formed by an individual SIP server 130 capacity divided by the sum of all equivalent SIP server 130 capacities may determine the individual SIP server's 130 load balancing allocation.

In one example, a first SIP server may have one-hundred (100) available ports for an IP prepaid service, and may register with a capacity of "100." A second SIP server 130 may have fifty (50) available ports, and may register with a capacity of "50." SIP proxy server 120 may order the proxy list for new SIP INVITE requests such that the first SIP server may be higher in the proxy list two thirds of the time, and the second SIP server may be higher in the proxy list one third of the time, thereby load balancing the traffic in proportion to available capacity.

Duration parameter 530 may specify the duration of time (e.g. in seconds) SIP REGISTER request 400 is applicable. In one implementation, SIP server 130 may re-register with SIP proxy server 120 before the duration expires, or it may lose its registration with SIP proxy server 120. For example, assume a SIP server registers at 5:00 PM for a duration of four (4) minutes, and at 5:01 PM the SIP server experiences a network failure and loses all SIP INVITE requests proxied to it. Each proxied SIP INVITE request may time out, and may fail to a lower SIP server in the proxy list (i.e., callers may experience a higher post-dial delay on a percentage of calls). A subsequent re-registration by the SIP server may not reach SIP proxy server 120. Thus, at 5:04 PM, the registration may expire, and the SIP server may no longer be included in subsequent load balancing calculations (i.e., callers may no longer experience post-dial delay associated with SIP INVITE request timeouts).

Timeout parameter 540 may specify a duration of time (e.g., in milliseconds) to wait for a SIP server to send a final response to an initial SIP INVITE request. If no response is received before timeout parameter 540 expires, the SIP server may be considered to have failed between a call offer and a call answer, and the SIP INVITE request may be proxied to the next SIP URI on the proxy list. A default value of zero (0) for timer parameter 540 may result in no timeouts occurring.

In one example, a SIP server may register with timeout parameter 540 equal to "1200" milliseconds. The SIP server may normally be able to answer a call within "100" milliseconds, but call offer information may be sent to a failed backend service. After "1200" milliseconds, SIP proxy server 120 may send a SIP CANCEL to this service, and may offer the call to the next SIP URI in the proxy list.

A disposition header may be provided in final responses to load balanced requests, such that the entities being load balanced may report that a final response should be proxied back to an originating agent, without the load balancer trying to offer the request to another entity. The disposition header may specify that a final response should be considered an authoritative response from a SIP server. SIP proxy server 120 may proxy this final response immediately and end a transaction. In this way, the SIP server may instruct SIP proxy server 120 to not waste resources sending a request to every SIP server in the proxy list. For example, the SIP server may receive a SIP INVITE request, and may determine that the call data supplied in the SIP INVITE request specifies a non-existent call plan. The SIP server may reject the SIP INVITE request transaction with a "service unavailable" response that specifies the header "Disposition: final" because the SIP server knows that no other SIP server will be able to service the call. Instead of proxying to the next SIP server on the proxy list, SIP proxy server 120 may send this failure response to the client initiating the call, and may end the call attempt.

Although FIG. 5 shows exemplary elements of SIP REGISTER request 400, in other implementations SIP REGISTER request 400 may contain fewer or additional elements that may permit real-time control of inbound traffic allocation.

Figure 6:
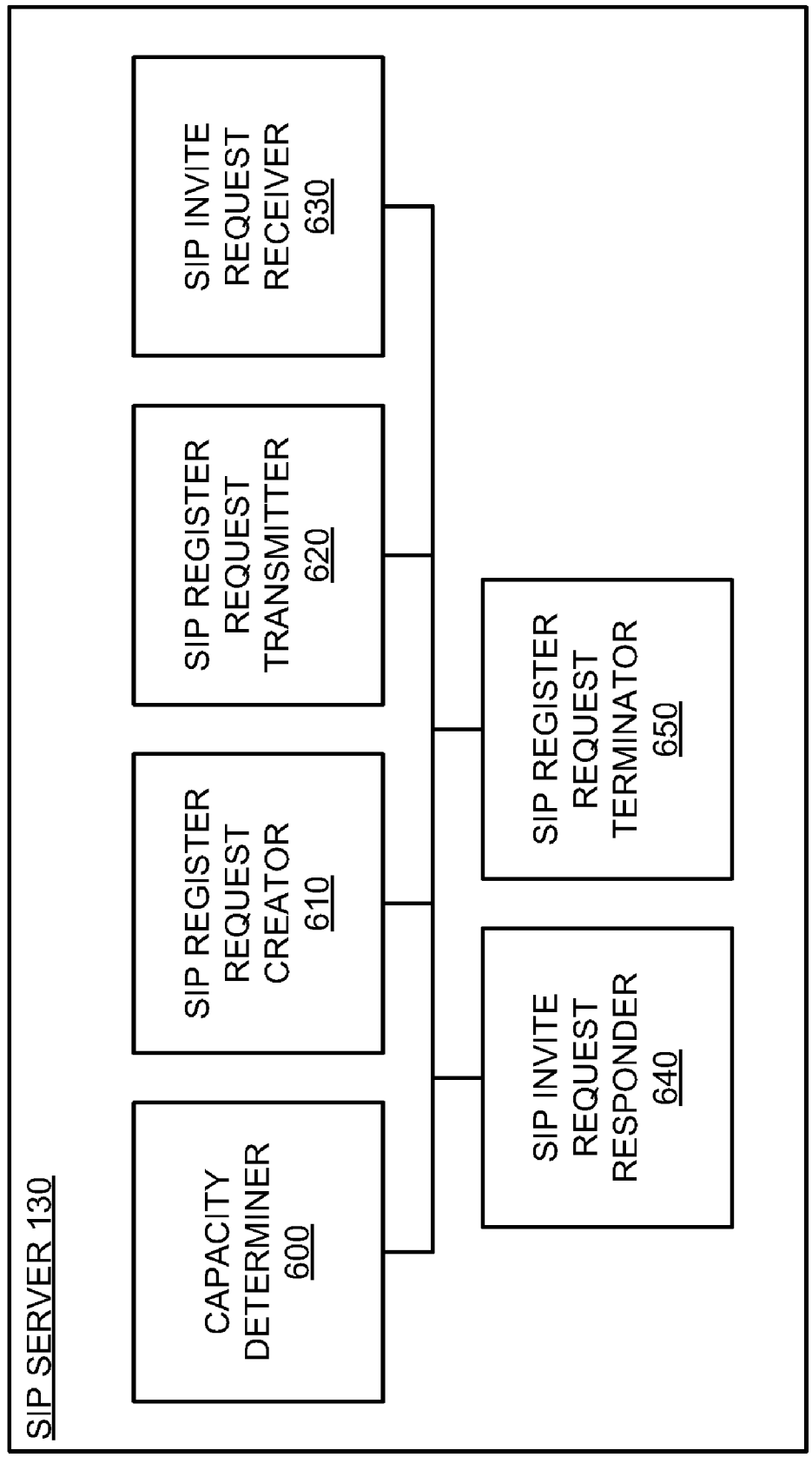
FIG. 6 is an exemplary diagram of a SIP server of the exemplary network of FIGS. 1 and 3.

FIG. 6 is an exemplary diagram showing exemplary components of SIP server 130. As shown, SIP server 130 may include a capacity determiner 600, a SIP REGISTER request creator 610, a SIP REGISTER request transmitter 620, a SIP INVITE request receiver 630, a SIP INVITE request responder 640, and/or a SIP REGISTER request terminator 650. Capacity determiner 600 may determine a capacity value for SIP server 130 based on available information (e.g., configured port count, DSP resource count, memory utilization, CPU utilization, human intervention, etc.). The capacity may be determined at various times (e.g., at startup of SIP server 130, while SIP server 130 is operating, etc.). SIP REGISTER request creator 610 may create a SIP REGISTER request (e.g., SIP REGISTER request 400 of FIG. 4) that may include SIP URI space parameter 500, precedence parameter 510, capacity parameter 520, duration parameter 530, and/or timeout parameter 540. SIP REGISTER request transmitter 620 may transmit the SIP REGISTER request created by SIP REGISTER request creator 610 to SIP proxy server 120.

SIP INVITE request receiver 630 may receive a SIP INVITE request from client 110, SIP proxy server 120, or another SIP server 130. SIP INVITE request responder 640 may respond to the SIP INVITE request received by SIP INVITE request receiver 630. For example, SIP INVITE request responder 640 may accept the SIP INVITE request and complete a call, or may reject the SIP INVITE request. If the SIP INVITE request is rejected by SIP INVITE request responder 640, the SIP INVITE request may be sent to another SIP server 130 or a failure response may be generated by SIP proxy server 120.

At any time, but before a pending SIP REGISTER request expires, capacity determiner 600 may re-evaluate and update the capacity of SIP server 130, SIP REGISTER request creator 610 may create an updated SIP REGISTER request based on the updated capacity, and SIP REGISTER request transmitter 620 may transmit the updated SIP REGISTER request to SIP proxy server 120. SIP proxy server 120 may receive the updated SIP REGISTER request, and may store (e.g., in register database 420) the updated SIP URI space, precedence, capacity, and/or duration parameters contained within the updated SIP REGISTER request.

If SIP server 130 is shutdown (e.g., an operator shuts down SIP server 130), then SIP REGISTER request terminator 650 may send a message terminating a SIP REGISTER request(s) for SIP server 130. If SIP server 130 halts due to software or hardware failures, then active SIP REGISTER request(s) for SIP server 130 may eventually expire (e.g., based on duration parameter 530) and may no longer be used for load balancing by SIP proxy server 120.

Although FIG. 6 shows exemplary components of SIP server 130, in other implementations SIP server 130 may contain fewer or additional components that may permit real-time control of inbound traffic allocation. In still other implementations, one or more components of SIP server 130 may perform the tasks performed by other components of SIP server 130.

FIGS. 7-8C are flowcharts of exemplary processes performed by SIP proxy server 120. More specifically, FIG. 7 is a flowchart of a process 700 for handling SIP REGISTER requests. FIGS. 8A-8C show a flowchart of a process 800 for load balancing.

As shown in FIG. 7, process 700 may receive SIP REGISTER request(s) (block 710). For example, in one implementation described above in connection with FIG. 4, SIP proxy server 120 may receive SIP REGISTER requests 400 from SIP servers 130.

Process 700 may store the SIP REGISTER request(s) (block 720). For example, in one implementation described above in connection with FIG. 4, SIP proxy server 120 may store SIP REGISTER requests 400 in register database 420. In another implementation described above in connection with FIG. 5, each SIP REGISTER request 400 may include a variety of information, e.g., a SIP URI space parameter, a precedence parameter, a duration parameter, and/or a capacity parameter. Such information may be stored in register database 420.

As further shown in FIG. 7, process 700 may determine whether a SIP REGISTER request(s) is updated (block 730). If the SIP REGISTER requests are updated (block 730—YES), then process 700 may return to blocks 710 and 720 and may receive and store the updated SIP REGISTER request(s). If the SIP REGISTER request(s) are not updated (block 730—NO), then process 700 may end. For example, in one implementation described above in connection with FIG. 6, at any time, but before a pending SIP REGISTER request expires, capacity determiner 600 may re-evaluate and update the capacity of SIP server 130, SIP REGISTER request creator 610 may create an updated SIP REGISTER request based on the updated capacity, and SIP REGISTER request transmitter 620 may transmit the updated SIP REGISTER request to SIP proxy server 120. SIP proxy server 120 may receive the updated SIP REGISTER request, and may store (e.g., in register database 420) the updated SIP URI space, precedence, capacity, and/or duration parameters contained within the updated SIP REGISTER request.

As shown in FIG. 8A, process 800 may receive a SIP INVITE request for a new inbound call (block 805). For example, in one implementation described above in connection with FIG. 4, SIP proxy server 120 may receive SIP INVITE requests 410 for new inbound calls from clients 110 and/or SIP servers 130. Process 800 may create an empty proxy list (block 810). For example, in one implementation described above in connection with FIG. 4, registration list selector 430 of SIP proxy server 120 may create an empty proxy list. In another implementation, registration list creator 440 of SIP proxy server 120 may create the empty proxy list instead of registration list selector 430.

As further shown in FIG. 8A, process 800 may select SIP REGISTER requests from a register database (block 815). For example, in one implementation described above in connection with FIG. 4, registration list selector 430 may select SIP REGISTER requests 400 from register database 420 that may be utilized to create a registration list. For example, registration list selector 430 may select SIP REGISTER requests 400 that have SIP URI spaces that are inclusive of a request URI of a SIP INVITE request 410, and/or that have registration durations that are not expired.

Process 800 may copy selected SIP REGISTER requests of equal, highest precedence values into a registration list (block 820). For example, in one implementation described above in connection with FIG. 4, registration list creator 440 may create an ordered registration list by copying SIP REGISTER requests 400 selected by registration list selector 430 that have equal, highest precedence values.

As further shown in FIG. 8A, process 800 may sum capacity values of SIP REGISTER requests provided in the registration list (block 825). Process 800 may store the sum as a group capacity scalar value (block 830). For example, in one implementation described above in connection with FIG. 4, load balancer 450 of SIP proxy server 120 may sum capacity values of SIP REGISTER requests 400 in the registration list and may store (e.g., in main memory 230, ROM 240, and/or storage device 250) the sum as a group capacity scalar value.

Process 800 may select a uniformly distributed capacity value between zero (0) and the stored group capacity scalar value (block 835). For example, in one implementation described above in connection with FIG. 4, load balancer 450 may choose a uniformly distributed random value between zero (0) and the stored group capacity scalar value.

Process 800 may continue to "A" of FIG. 8B and may traverse the registration list in order and may accumulate or sum the capacities of each SIP REGISTER request until the accumulated capacity value is greater than the selected random value (block 840). For example, in one implementation described above in connection with FIG. 4, load balancer 450 may traverse the registration list in order, and may accumulate the capacity of each SIP REGISTER request 400 until the accumulated capacity value is greater than the chosen random value.

Process 800 may remove the last SIP REGISTER request traversed from the registration list and may provide such SIP REGISTER request at the end of the proxy list (block 845). For example, in one implementation described above in connection with FIG. 4, load balancer 450 may remove the last SIP REGISTER request 400 traversed from the registration list and may provide the last SIP REGISTER request 400 traversed at the end of the proxy list.

As further shown in FIG. 8B, process 800 may determine whether the registration list is empty (block 850). If the registration list is not empty (block 850—NO), process 800 may return to block 820 ("B" of FIGS. 8A and 8B). For example, in one implementation described above in connection with FIG. 4, SIP proxy server 120 may repeat the tasks performed by registration list creator 440 and load balancer 450 until the registration list is empty.

If the registration list is empty (block 850—YES), process 800 may determine whether registered precedence values have been processed from highest to lowest (block 855). If the registered precedence values have not been processed (block 855—NO), process 800 may return to block 825 ("C" of FIGS. 8A and 8B). For example, in one implementation described above in connection with FIG. 4, load balancer 450 may repeat the calculation of the group capacity scalar value until registered precedence values have been processed from highest to lowest.

As further shown in FIG. 8B, if the registered precedence values have been processed (block 855—YES), process 800 may proxy to the first SIP URI in the proxy list (block 860). For example, in one implementation described above in connection with FIG. 4, load balancer 450 may proxy to a first SIP URI in the proxy list.

Process 800 may continue to "D" of FIG. 8C and may determine whether the proxied SIP INVITE request has timed out or has been rejected (block 865). If the proxied SIP INVITE request has timed out or has been rejected (block 865—YES), then process 800 may remove a first SIP URI from the proxy list (block 870) and may return to process block 860 ("E" of FIGS. 8B and 8C). Otherwise (block 865—NO), process 800 may determine whether the proxied SIP INVITE request is handled (block 875). For example, in one implementation described above in connection with FIG. 4, if SIP INVITE request 410 times out or is rejected, load balancer 450 may remove the first SIP URI from the proxy list. Load balancer 450 may repeat these tasks until the proxy list is exhausted or until SIP INVITE request 410 is successfully accepted or handled by one of SIP servers 130.

As further shown in FIG. 8C, if the proxied SIP INVITE request is not handled (block 875—NO), process 800 may return a failure response (block 880). Otherwise (block 875—YES), process 800 may handle the SIP INVITE request (block 885). For example, in one implementation described above in connection with FIG. 4, if one SIP server 130 accepts or handles SIP INVITE request 410, SIP proxy server 120 may send SIP INVITE request 410 to the appropriate SIP server 130 (as shown at reference number 460). In another implementation, if no SIP servers 130 handle SIP INVITE request 410, load balancer 450 may provide a failure response (e.g., to client 110 and/or SIP server 130 providing SIP INVITE request 410).

Figure 9:
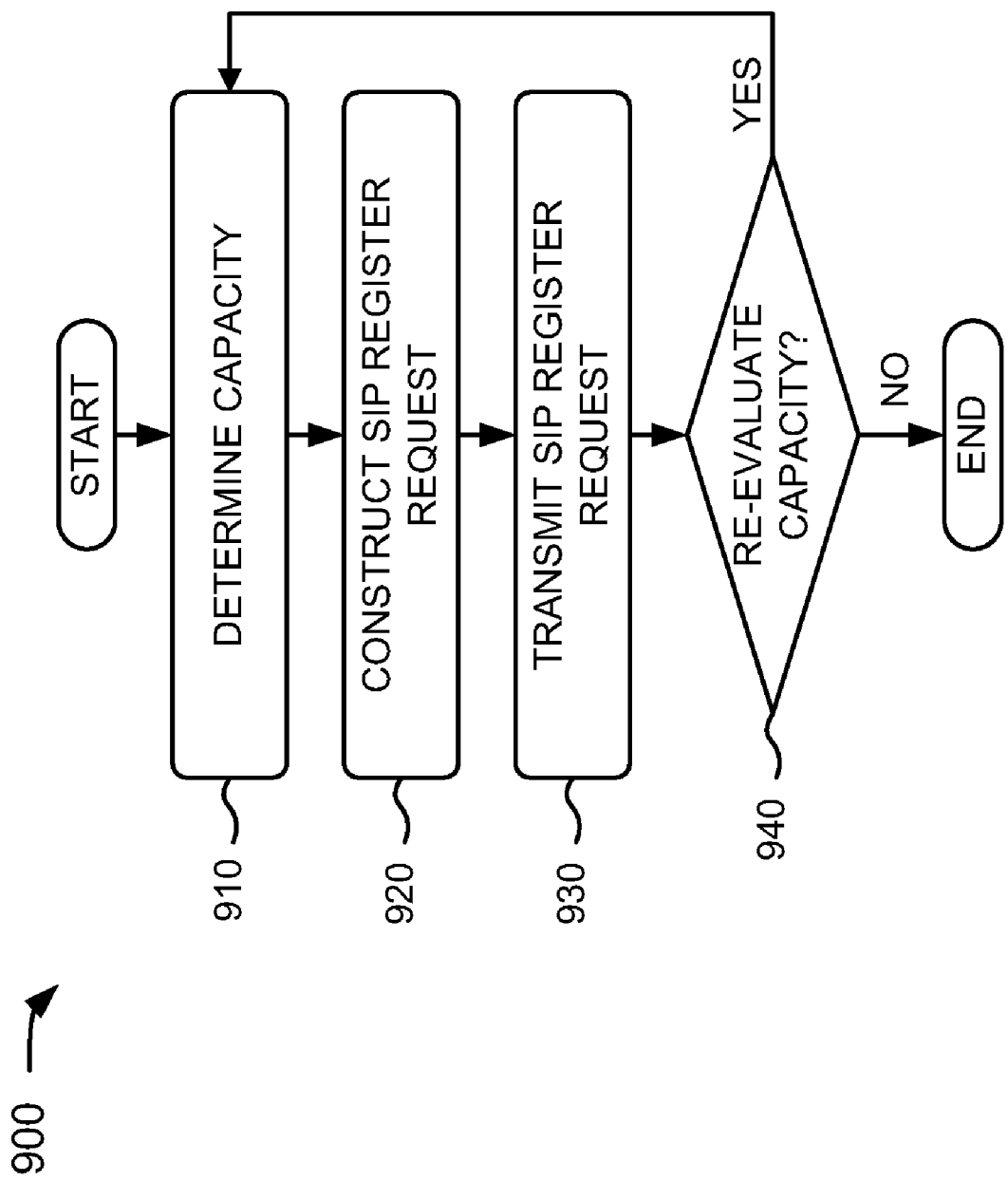
FIGS. 9-11 are flowcharts of exemplary processes for a SIP server of FIGS. 1 and 3 according to implementations consistent with principles of the invention.
Figure 10:
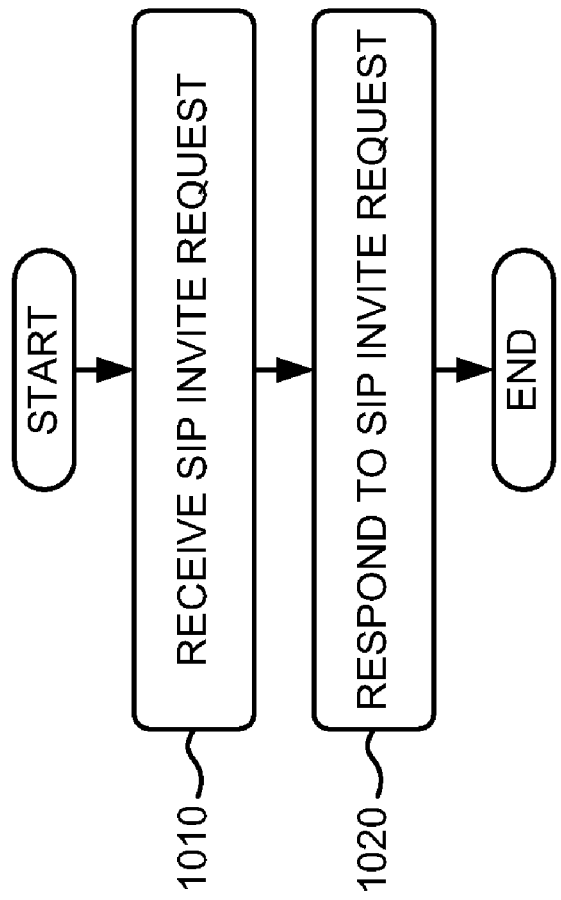
Figure 11:
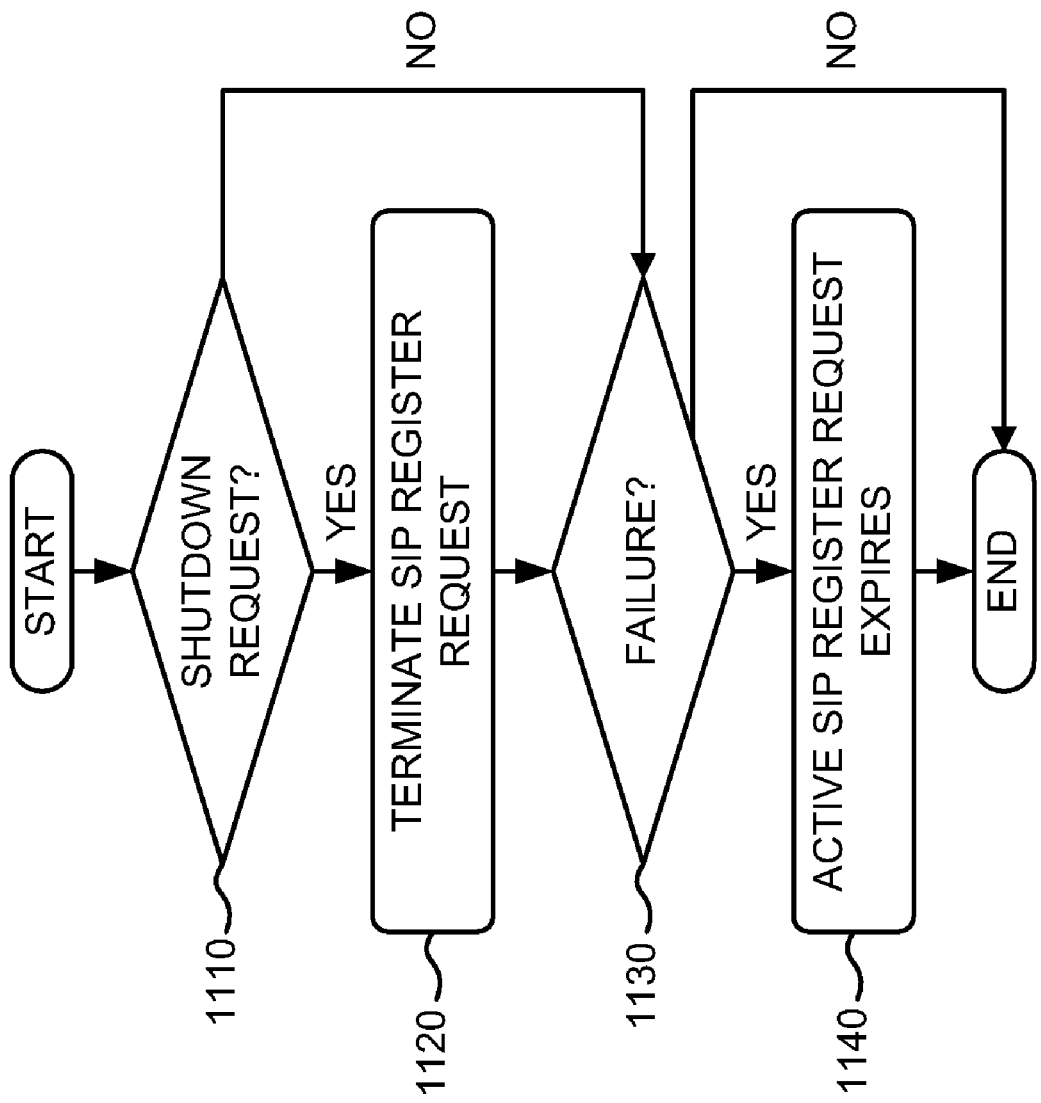

FIGS. 9-11 are flowcharts of exemplary processes performed by SIP server 130. More specifically, FIG. 9 is a flowchart of a process 900 for determining capacity and creating SIP REGISTER requests. FIG. 10 is a flowchart of a process 1000 for responding to a SIP INVITE request. FIG. 11 is a flowchart of a process 1100 performed when a shutdown or a failure occurs.

As shown in FIG. 9, process 900 may determine the capacity of a SIP server (block 910). For example, in one implementation described above in connection with FIG. 6, capacity determiner 600 of SIP server 130 may determine a capacity value for SIP server 130 based on available information (e.g., configured port count, DSP resource count, memory utilization, human intervention, etc.). The capacity may be determined at various times (e.g., at startup of SIP server 130, while SIP server 130 is operating, etc.).

Process 900 may construct a SIP REGISTER request with a SIP URI space parameter, a precedence parameter, a capacity parameter, a duration parameter, and/or a timeout parameter (block 920). For example, in one implementation described above in connection with FIG. 6, SIP REGISTER request creator 610 of SIP server 130 may create a SIP REGISTER request (e.g., SIP REGISTER request 400 of FIG. 4) that may include SIP URI space parameter 500, precedence parameter 510, capacity parameter 520, duration parameter 530, and/or timeout parameter 540.

As further shown in FIG. 9, process 900 may transmit the SIP REGISTER request to a SIP proxy server (block 930). For example, in one implementation described above in connection with FIG. 6, SIP REGISTER request transmitter 620 of SIP server 130 may transmit the SIP REGISTER request created by SIP REGISTER request creator 610 to SIP proxy server 120.

Process 900 may determine whether to re-evaluate the capacity of the SIP server (block 940). If the capacity is to be re-evaluated (block 940—YES), then process 900 may return to block 910 and repeat process blocks 910-930. Otherwise (block 940—NO), process 900 may cease. For example, in one implementation described above in connection with FIG. 6, at any time, but before a pending SIP REGISTER request expires, capacity determiner 600 may re-evaluate and update the capacity of SIP server 130, SIP REGISTER request creator 610 may create an updated SIP REGISTER request based on the updated capacity, and SIP REGISTER request transmitter 620 may transmit the updated SIP REGISTER request to SIP proxy server 120. SIP proxy server 120 may receive the updated SIP REGISTER request, and may store (e.g., in register database 420) the updated SIP URI space, precedence, capacity, and/or duration parameters contained within the updated SIP REGISTER request.

As shown in FIG. 10, process 1000 may receive a SIP INVITE request from a client, a SIP proxy server, or a SIP server (block 1010). For example, in one implementation described above in connection with FIG. 6, SIP INVITE request receiver 630 of SIP server 130 may receive a SIP INVITE request from client 110, SIP proxy server 120, or another SIP server 130.

As further shown in FIG. 10, process 1000 may respond to the SIP INVITE request (block 1020). For example in one implementation described above in connection with FIG. 6, SIP INVITE request responder 640 of SIP server 130 may respond to the SIP INVITE request received by SIP INVITE request receiver 630. SIP INVITE request responder 640 may accept the SIP INVITE request and complete a call, or may reject the SIP INVITE request. If the SIP INVITE request is rejected by SIP INVITE request responder 640, the SIP INVITE request may be sent to another SIP server 130 or a failure response may be generated by SIP proxy server 120.

As shown in FIG. 11, process 1100 may determine whether a shutdown request has been generated (block 1110). If a shutdown request has been generated (block 1110—YES), process 1100 may terminate SIP REGISTER request(s) (block 1120). For example, in one implementation described above in connection with FIG. 6, if SIP server 130 is shutdown (e.g., an operator shuts down SIP server 130), then SIP REGISTER request terminator 650 may send a message terminating a SIP REGISTER request(s) for SIP server 130.

As further shown in FIG. 11, if a shutdown request has not been generated (block 1110—NO), process 1100 may determine whether a failure has occurred (block 1130). If a failure has occurred (block 1130—YES), process 1100 may permit active SIP REGISTER request(s) to expire (block 1140). Otherwise (block 1130—NO), process 1100 may end. For example, in one implementation described above in connection with FIG. 6, if SIP server 130 halts due to software or hardware failures, then active SIP REGISTER request(s) for SIP server 130 may expire and may no longer be used for load balancing by SIP proxy server 120.

Systems and methods described herein may use SIP messaging between a SIP server(s) and a load balancing SIP proxy server(s) to permit real-time control of inbound traffic allocation. The systems and methods may implement the logic of load balancing traffic to individual SIP servers in the SIP proxy server(s), rather than in the DNS resolution process. This may permit the SIP proxy server(s) to update the traffic allocation parameters on an instantaneous basis.

The systems and methods may provide dynamic load balancing between SIP servers that may be subject to finite capacity constraints, and may provide automatic failover capability between SIP servers. The systems and methods may further be used to create dynamic proxy routing between SIP proxies since SIP servers may also be SIP proxy servers. A SIP server may provide automatic feedback to a SIP proxy for the purposes of load balancing, and may provide a SIP REGISTER request to specify a scalar capacity value, a precedence, and/or URI space beyond a simple SIP URI. A SIP proxy may proxy a SIP INVITE request based on matching to a URI space, based on a scalar capacity value using load balancing, and/or based on precedence to enable automatic configuration of high availability architectures (e.g., a primary/secondary configuration).

The foregoing description provides illustration and description, but is not intended to be exhaustive or to limit the embodiments to the precise form disclosed. Modifications and variations are possible in light of the above teachings or may be acquired from practice of the invention.

For example, while series of acts have been described with regard to the flowcharts of FIGS. 7-11, the order of the acts may differ in other implementations consistent with principles of the invention. Further, non-dependent acts may be performed in parallel.

In another example, although FIGS. 4 and 6 show tasks being performed by SIP proxy server 120 and SIP server 130, respectively, in other implementations the tasks shown in FIGS. 4 and 6 may be performed by a single server (e.g., SIP proxy server 120 or SIP server 130). Alternatively, some of the tasks shown in FIGS. 4 and 6 may be performed by another device (outside SIP proxy server 120 and SIP server 130).

Embodiments, as described above, may be implemented in many different forms of software, firmware, and hardware in the implementations illustrated in the figures. The actual software code or specialized control hardware used to implement embodiments consistent with principles of the invention is not limiting of the invention. Thus, the operation and behavior of the embodiments were described without reference to the specific software code—it being understood that one would be able to design software and control hardware to implement the embodiments based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a Session Initiation Protocol (SIP) proxy server, SIP REGISTER requests, each SIP REGISTER request including registration information including at least one of:
        a Uniform Resource Identifier (URI) space, a capacity value, a duration value, or a precedence value associated with a class of service; and
    load balancing, using the SIP proxy server, a SIP call based on the registration information of the SIP REGISTER requests, where the load balancing includes:
        creating, using the SIP proxy server, a proxy list;
        selecting, using the SIP proxy server, SIP REGISTER requests that include URI spaces that are inclusive of a request URI, of a SIP INVITE request associated with the SIP call, and include unexpired durations;

creating, using the SIP proxy server, a registration list including selected SIP REGISTER requests that include certain precedence values;
summing, using the SIP proxy server, capacity values of the selected SIP REGISTER requests, in the registration list, to create a group capacity scalar value;
selecting, using the SIP proxy server, a random value between zero and the group capacity scalar value;
summing, using the SIP proxy server, the capacity values of the selected SIP REGISTER requests in the registration list, in order of precedence values, until an accumulated capacity value is greater than the selected random value;
removing, using the SIP proxy server, and from the registration list, a last SIP REGISTER request for which a capacity value was added to the accumulated capacity value;
providing, using the SIP proxy server, the removed SIP REGISTER request to the proxy list;
repeating, using the SIP proxy server, the creating a registration list, the summing capacity values of the selected SIP REGISTER requests, in the registration list, to create a group capacity scalar value, the selecting a random value, the summing the capacity values of the selected SIP REGISTER requests in the registration list, in order, until an accumulated capacity value is greater than the selected random value, the removing a SIP REGISTER request, and the providing the removed SIP REGISTER request until the registration list is empty;
repeating, using the SIP proxy server, the summing capacity values until the precedence values have been processed from highest to lowest; and
proxying, using the SIP proxy server, to a certain SIP URI, in the proxy list, to respond to the SIP call.

2. The method of claim 1, further comprising:
removing, using the SIP proxy server, the certain SIP URI from the proxy list and proxying to a next SIP URI in the proxy list if one of a timeout of the SIP INVITE request or a rejection of the SIP INVITE request occurs;
providing, using the SIP proxy server, the SIP call to the certain SIP URI if the SIP call is handled; and
generating, using the SIP proxy server, a failure if the SIP call is not handled.

3. The method of claim 1, where the load balancing provides real-time control of allocation of the SIP call.

4. The method of claim 1, where the SIP REGISTER requests provide automatic feedback for the load balancing.

5. A method comprising:
determining, using one or more processors associated with a Session Initiation Protocol (SIP) server, a capacity of the SIP server;
constructing, using the one or more processors associated with the SIP server, a SIP REGISTER request that includes registration information including a precedence value associated with a class of service, a capacity value, and at least one of:
a Uniform Resource Identifier (URI) space or a duration value; and
transmitting, using the one or more processors associated with the SIP server, the SIP REGISTER request to a SIP proxy server to automatically provide feedback to load balance, based on the precedence value and the capacity value, traffic incoming to the SIP server.

6. The method of claim 5, further comprising:
re-evaluating, using the one or more processors associated with the SIP server, the capacity of the SIP server;
constructing, using the one or more processors associated with the SIP server, an updated SIP request providing updated registration information based on the re-evaluated capacity of the SIP server; and
transmitting, using the one or more processors associated with the SIP server, the updated SIP request to the SIP proxy server.

7. The method of claim 5, where the capacity of the SIP server is determined based on information available to the SIP server.

8. The method of claim 7, where the available information includes at least one of:
a configured port count of the SIP server,
a digital signal processing (DSP) resource count of the SIP server,
a memory utilization of the SIP server, or
a CPU utilization of the SIP server.

9. The method of claim 5, where the capacity of the SIP server is determined at one of an initial startup of the SIP server or while the SIP server is operating.

10. The method of claim 5, further comprising:
receiving, using the one or more processors associated with the SIP server, a SIP INVITE request; and
responding, using the one or more processors associated with the SIP server, to the SIP INVITE request.

11. The method of claim 10, where responding to the SIP INVITE request includes one of:
accepting, using the one or more processors associated with the SIP server, the SIP INVITE request or
rejecting, using the one or more processors associated with the SIP server, the SIP INVITE request.

12. The method of claim 5, further comprising:
terminating, using the one or more processors associated with the SIP server, the SIP REGISTER request if the SIP server is shutdown; and
permitting, using the one or more processors associated with the SIP server, the SIP REGISTER request to expire based on the duration value, if the SIP server fails.

13. A system comprising:
a Session Initiation Protocol (SIP) proxy server, including one or more processors, the SIP proxy server comprising:
a register memory that receives and stores SIP REGISTER requests, each SIP REGISTER request providing registration information; and
a load balancer that load balances a SIP call based on the registration information of the SIP REGISTER requests, where the one or more processors of the SIP proxy server are to:
create a registration list from selected SIP REGISTER requests that include precedence values;
sum capacity values of the selected SIP REGISTER requests in the registration list to create a group capacity scalar value;
select a random value between zero and the group capacity scalar value;
sum, in order of the precedence values, the capacity values of the selected SIP REGISTER requests in the registration list, until an accumulated capacity value is greater than the selected random value;
remove, from the registration list, a last SIP REGISTER request for which a last capacity value was added to the accumulated capacity value;
provide the removed SIP REGISTER request to a proxy list;
repeat, using the SIP proxy server, to:
create a registration list, sum capacity values of the selected SIP REGISTER requests, in the registration list, to create a group capacity scalar value, select a random value, sum capacity values of the selected SIP REGISTER requests in the registration list, in order of precedence values, until an accumulated capacity value is greater than the selected random value, remove a SIP REGISTER request, and provide the removed SIP REGISTER request until the registration list is empty;

sum the capacity values until the precedence values have been processed from highest to lowest; and proxy to a certain SIP URI, in the proxy list, to respond to the SIP call.

14. The system of claim 13, where the registration information includes one or more of a Uniform Resource Identifier (URI) space, a capacity value, a duration value, or a precedence value.

15. The system of claim 14, where the one or more processors of the SIP proxy server are further to:

select SIP REGISTER requests from the register memory, the SIP REGISTER requests including SIP URI spaces that are inclusive of a request URI of a call and include unexpired durations; and create a registration list, ordered by the precedence values, by copying the selected SIP REGISTER requests, including certain precedence values.

16. The system of claim 14, where:

the URI space comprises a pattern for matching with a received SIP URI;

the capacity value specifies a quantity of service to be provided for a specified SIP URI;

the duration value specifies a duration of time that the SIP request is applicable; and the precedence value specifies a class of service for a specified SIP URI.

* * * * *